March 22, 1960 J. B. McWILLIAMS 2,929,466
RAIL FLANGE LUBRICATOR
Filed March 17, 1958 8 Sheets-Sheet 1

Fig. 1

INVENTOR.
James B. McWilliams
BY 
HIS ATTORNEY

March 22, 1960

J. B. McWILLIAMS 2,929,466

RAIL FLANGE LUBRICATOR

Filed March 17, 1958

INVENTOR.
James B. McWilliams
BY
HIS ATTORNEY

Fig. 3

March 22, 1960 J. B. McWILLIAMS 2,929,466
RAIL FLANGE LUBRICATOR
Filed March 17, 1958 8 Sheets-Sheet 4

Fig. 4

INVENTOR.
James B. McWilliams
BY
HIS ATTORNEY

March 22, 1960  J. B. McWILLIAMS  2,929,466
RAIL FLANGE LUBRICATOR
Filed March 17, 1958  8 Sheets-Sheet 5

Fig. 5  Fig. 6

INVENTOR.
James B. McWilliams
BY
HIS ATTORNEY

March 22, 1960     J. B. McWILLIAMS     2,929,466
RAIL FLANGE LUBRICATOR Filed March 17, 1958     8 Sheets-Sheet 6

INVENTOR.
James B. McWilliams
BY 
HIS ATTORNEY

March 22, 1960  J. B. McWILLIAMS  2,929,466
RAIL FLANGE LUBRICATOR
Filed March 17, 1958  8 Sheets-Sheet 7

INVENTOR.
James B. McWilliams
BY
HIS ATTORNEY

United States Patent Office 2,929,466
Patented Mar. 22, 1960

2,929,466

RAIL FLANGE LUBRICATOR

James B. McWilliams, Pittsburgh, Pa., assignor to Railway Maintenance Corporation, Pittsburgh, Pa., a corporation of Pennsylvania, and Poor & Company, Chicago, Ill., a corporation of Delaware, jointly Application March 17, 1958, Serial No. 722,029

3 Claims. (Cl. 184—3)

This invention relates to lubricators for supplying grease to the gauge side of railway rails by the wheels of passing cars actuating grease pumping means.

While lubricators utilizing a ramp operated pump shaft have been heretofore used, these shafts require a multiplicity of parts between the ramp and the pump shaft including conventional universal joints. As a consequence these shafts have always been troublesome from a maintenance standpoint. Also in many instances the coil spring between the free end of the ramp and the related arm on the pump shaft provide further source of trouble. Having in view the expense of maintenance, the present invention is intended to simplify the construction and reduce the number of parts to a minimum.

One of the objects is to provide a novel wheel operated ramp and ramp frame assembly, whereby these two parts may be readily interfitted by merely placing them together for mounting on the rail support. In that connection the ramp and frame have complementary stop portions and the ramp is formed with an integral stub shaft which readily fits into a journal sleeve on the frame.

Another object is to provide a self-adjusting ribbon spring for connecting the ramp stub shaft and the primary pump shaft. This spring is axially preformed by twisting it so that the opposite ends are disposed at right angles to each other to facilitate installation by easily coupling the stub shaft to the primary pump shaft. The helical form of the ribbon spring effectively assists in the function of tensioning the ramp and pump shaft to maintain the ramp in proper elevated relation to the rail tread and the levers on the pump shaft in proper relation to the pump rods. This ribbon spring also because of its simple mounting and lateral as well as angular axial adjustability, takes the place of universal joints where there is any difference in the horizontal or vertical position of the axis of the ramp stub shaft and the primary pump shaft.

Another object is to provide simple and practical adjustment means between the upper ends of the pump rods and the pump levers on the pump shaft to keep the ramp lever in contact with the ramp stop while maintaining constant stroke on the pump rods to compensate for wear on the few moving parts.

A still further object is to provide a self-contained pump unit which can be assembled and tested on a workbench in the shop. This has the advantage that in case of repair or replacement, the unit can be taken out of the grease tank with a minimum of time and work, and readily repaired or replaced with another unit.

A still further object is to provide a simple and practical wiping bar assembly which permits of wider outlet slots than heretofore used to assure an ample supply of grease to the gauge side of the rail.

With the above and other objects in view which will more readily appear as the nature of the invention is better understood, the same consists in the novel construction, combination, and arrangement of parts hereinafter more fully described, illustrated and claimed.

A preferred and practical embodiment is shown in the accompanying drawings, in which.

Similar reference characters designate corresponding parts throughout the several figures of the drawings.

Figure 1:
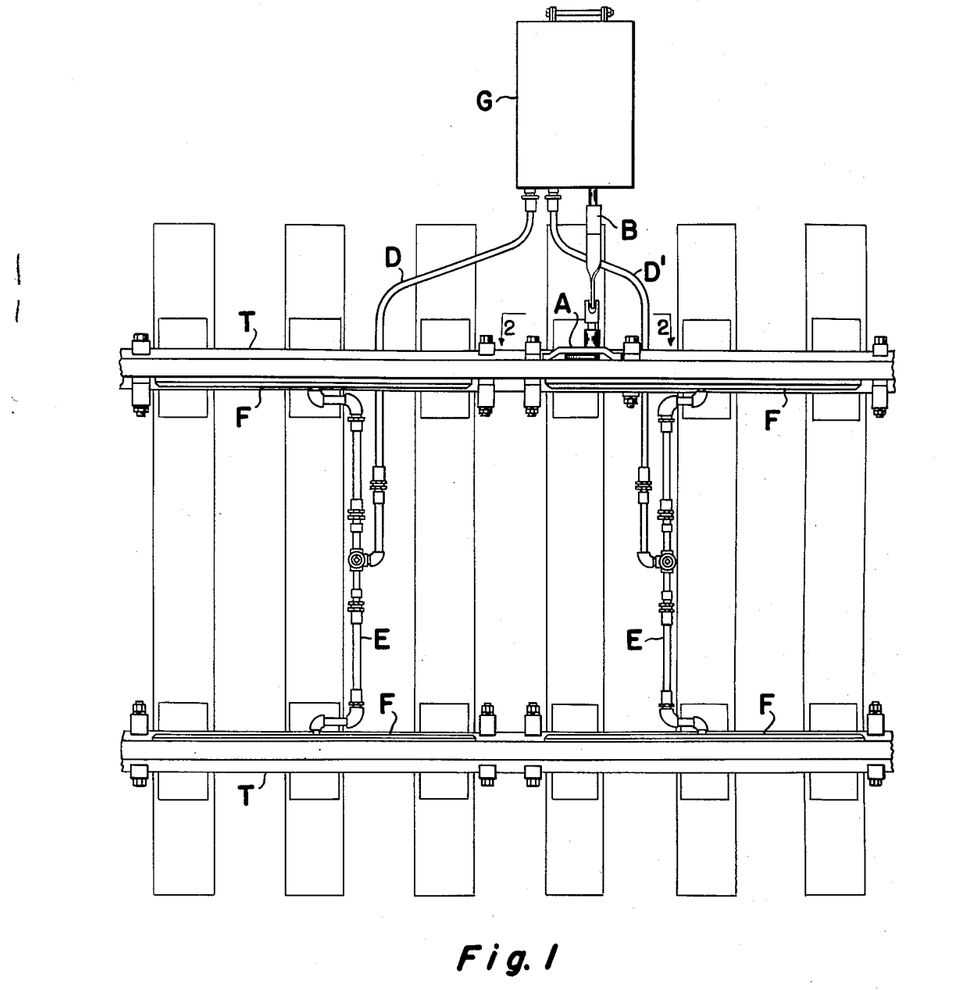
Figure 1 is a plan view of the entire lubricating unit installed in a trackway.
Figure 3:
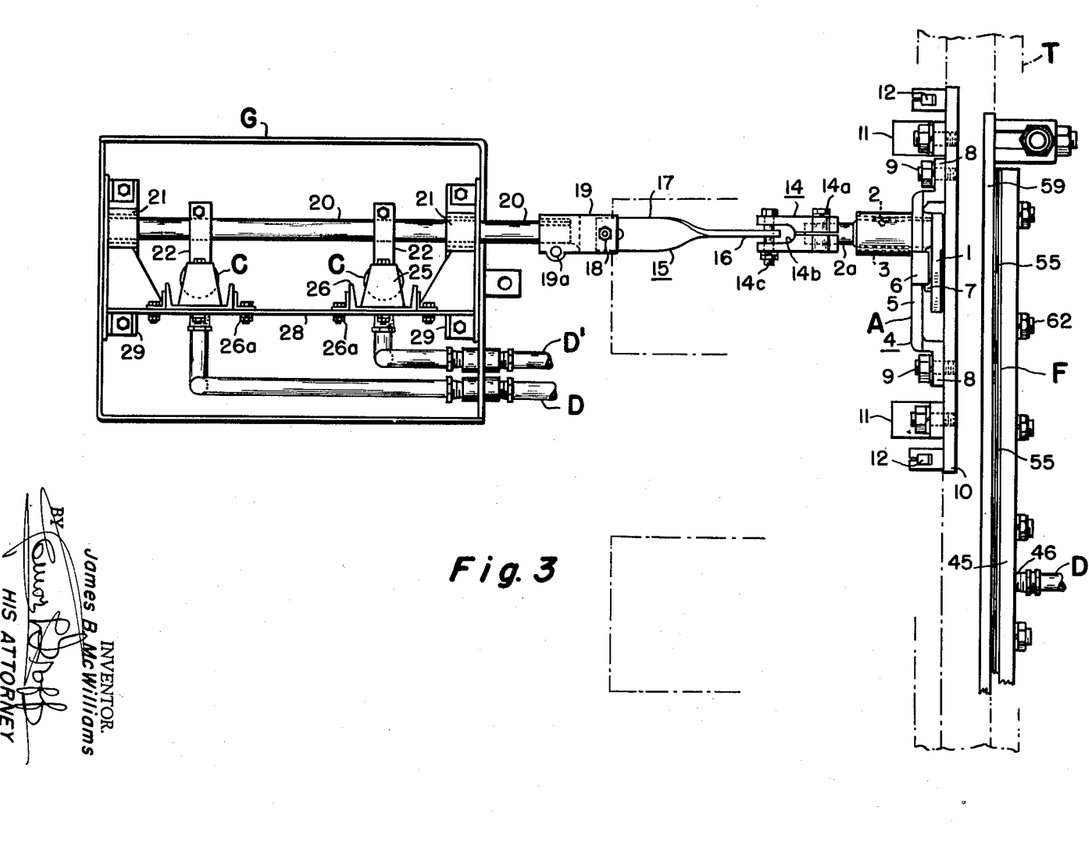
Figure 3 is an enlarged plan view of the machine with certain parts omitted for clarity and illustrating the ramp assembly, the ribbon shaft and the primary pump saaft carrying the pump levers which actuate the pump rods.

Referring to Figure 1, it will be observed that the track designated generally as T has one of its rails provided on the field side with a ramp lever designated generally as A. This lever is responsive to depression by successive passing wheels to turn a line of pump actuating connections B leading to suitable pump units C (Fig. 3). These pump units are fitted with suitable pipes or flexible tubing D and D' which lead to the selected or preferred arrangement of pipes E communicating with the grease distribution units or wiping bars F arranged at the inner or gauge side of the rails of the track.

The pump units C are contained in a suitable grease tank or pot G located at one side of the trackway in the customary manner.

Ramp lever and frame

Figure 2:
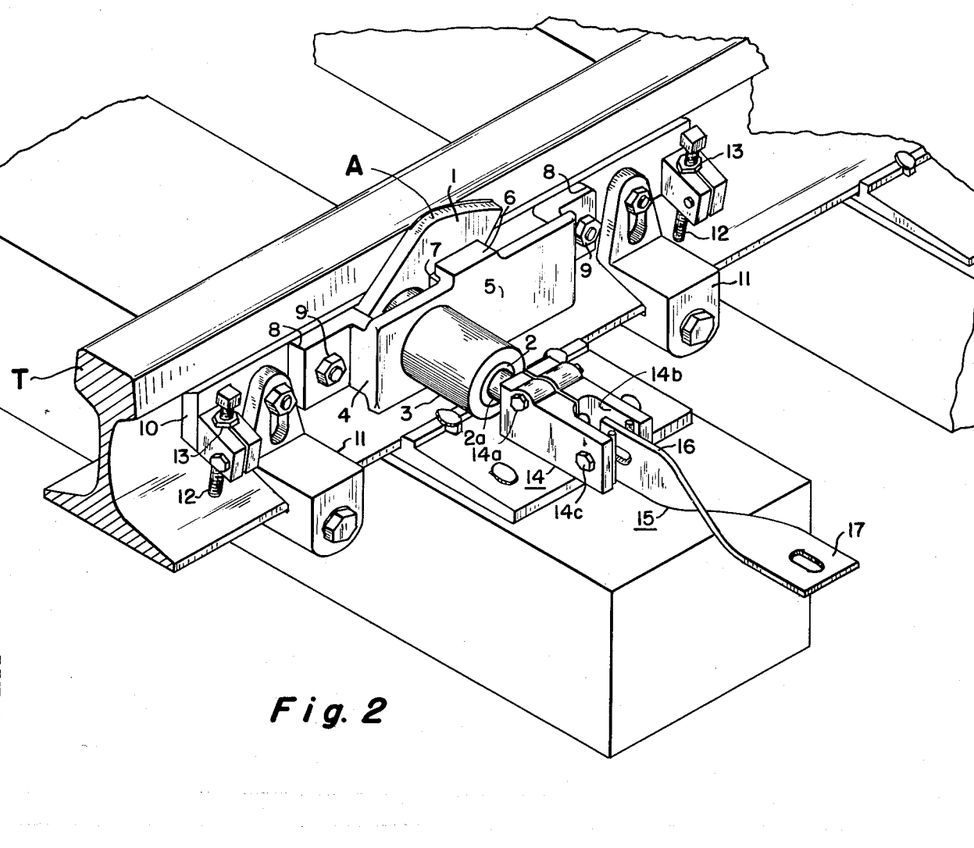
Figure 2 is a detail isometric perspective view of the ramp unit.
Figure 4:
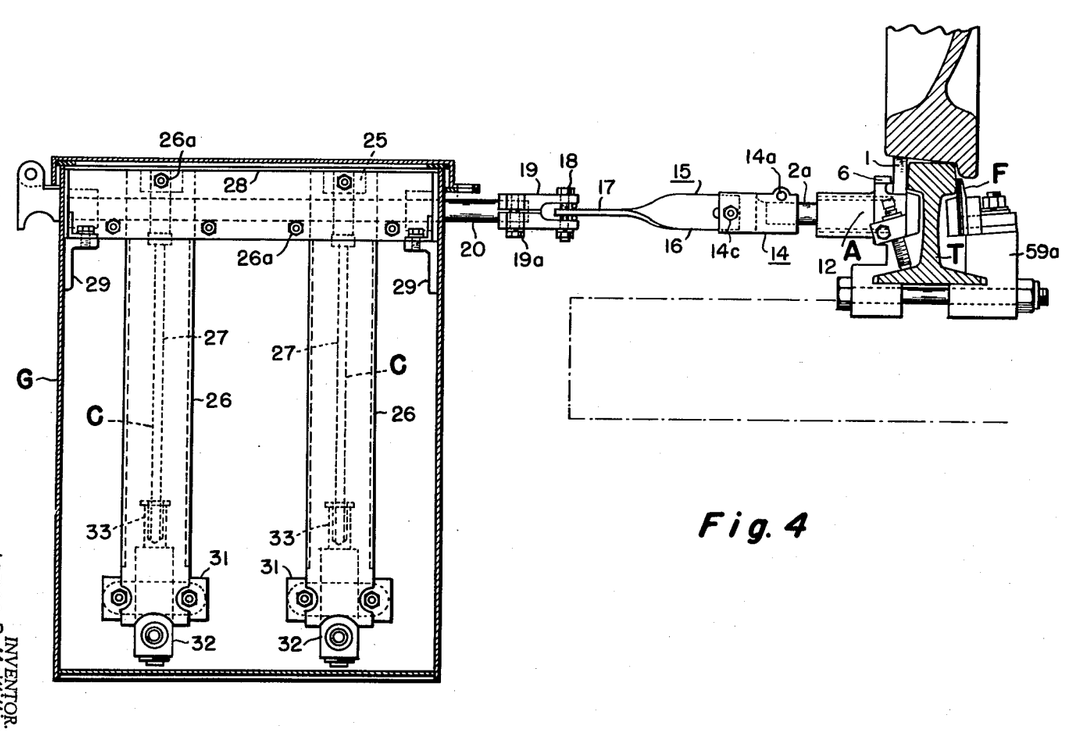
Figure 4 is a side elevation, partly in section of the ramp assembly and pump unit shown in Figure 3.

As will be observed from Figs. 2, 3, and 4, the ramp lever assembly, designated generally as A, includes a lever arm 1 spring urged normally to project above the adjacent rail tread.

This lever arm has an integral stub shaft 2 which constitutes the axis of movement of the arm when it is struck by successive passing wheels. The stub shaft 2 is journalled in a bearing sleeve 3 of the ramp frame 4 which includes a medial body portion 5 provided at the top of its inner face with an abutment 6 for engaging with a limiting stop 7 offset from the related face of the lever arm 1.

The ramp frame 4 is provided at each end thereof with offset foot portions 8, 8 which are secured by fastenings 9 to support 10 adjustably mounted in a conventional manner on the rail clamps 11 to position the support 10 and the ramp frame assembly properly in relation to the head of the rail. The support 10 is also provided with the adjusting screws 12 whose lower ends bear against the upper face of the rail base flange. When these screws are turned in the nut portions 13, the screws serve to accurately adjust the ramp lever frame in relation to the rail head so that the ramp lever arm will project above the tread of the rail to be engaged by passing car wheels.

The stub shaft 2, which is integral with the lever 1, is provided with a reduced end portion 2ª which receives a coupling member 14 in the form of a pinch bolt for connecting the stub shaft with a spring ribbon shaft 15. That is to say, as will appear from Fig. 3 the coupling 14 includes a fastening 14ª which joins the coupling with the portion 2ª of the stub shaft, said coupling also having a recess 14ᵇ for receiving the fastening 14ᶜ for entering a slot in the ribbon shaft to connect the coupling with the end 16 of said shaft.

The ribbon shaft

The ribbon shaft constitutes one of the distinctive features of the present invention. It is formed from a strip of spring steel, approximately ³⁄₁₆ of an inch in thickness and 2 inches in width, which is twisted so that its opposite end portions 16 and 17 are disposed at 90° to each other.

For example, in manufacture the strip which is approximately 500 Brinell is twisted 90°, then stress relieved, and, thereafter, is further twisted to 93° and hardened so that it will come back to 90° and retain that shape.

As will be seen from Figs. 2, 3 and 4, the end 17 of the strip is also slotted to receive fastening 18 connecting the same with a coupling 19, which, in turn, is secured by pinch bolt 19ª to a primary pump shaft 20 rotatably supported in bearings 21, 21 within the casing of the grease tank G.

Grease tank and pumps

The primary pump shaft 20 carries radially offset pump arms 22, Figs. 3, 4, 5 and 6. The arms 22 are slotted at one end and clamped to the primary pump shaft 20 by suitable pinch bolt 23. The end of each arm opposite the fastening 23 is interiorly threaded to receive an adjusting screw 24.

It will be understood that there are two of the pump arms 22 because two pumping units are desirably utilized.

Since the two pump units are the same for all intent and purpose, a description of one will suffice for the other. Therefore, the same reference numerals will be applied.

A distinctive feature of the pump units is that they may be fabricated and fully tested in the shop, and are so mounted or suspended within the grease tank G that in the event repairs or replacements are necessary this operation can be carried out with great facility.

The upper end of the adjusting screw 24 engages a fixed stop element 25. The head of each adjusting screw 24 is provided with socket 24ª to receive the upper end of a pump rod 27.

Each pump unit preferably includes the channel member 26 whose upper end is secured by fastenings 26ª to a crossbar 28 which traverses the upper portion of the tank as will be apparent from Fig. 4, and which also supports the fixed stop element 25. The crossbar is preferably supported at its front and rear ends upon the angle brackets 29 as will be apparent from Fig. 4, thus adding substantial stability to the mounting of each pump unit.

Figure 5:
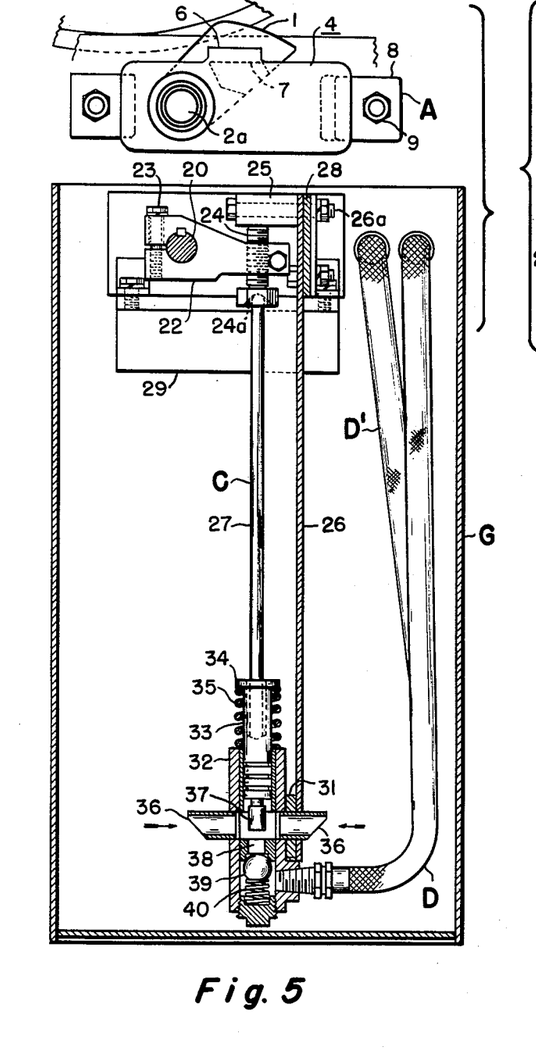
Figure 5 is a detail composite elevation and a vertical sectional view taken through the grease tank with the parts thereof in a position when the ramp is elevated and about to be engaged by a car wheel, diagrammatically indicated in the upper part of this view.
Figure 6:
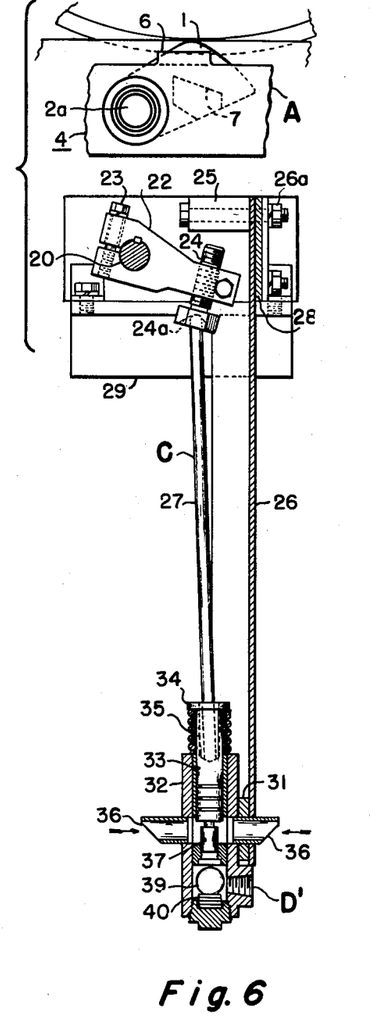
Figure 6 is a more or less diagrammatic view similar to Figure 5, illustrating the ramp lever depressed and the pump lever also depressed to push out the grease.
Figure 7:
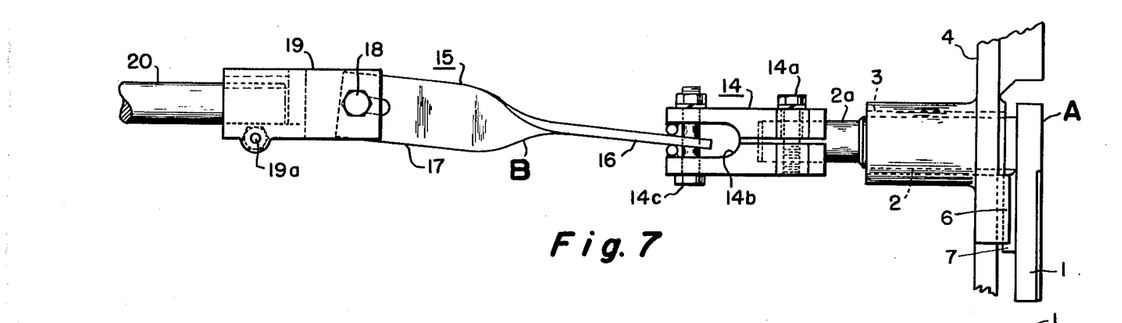
Figure 7 is an enlarged detail plan view of the ribbon shaft assembly including the ramp lever as it would appear when the grease tank is offset laterally.
Figure 8:
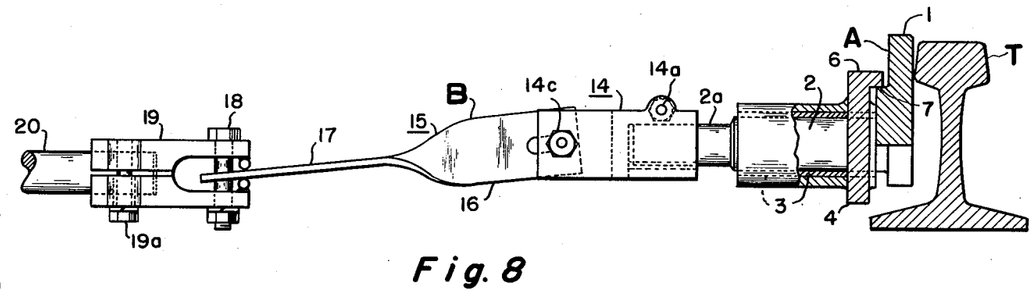
Figure 8 is a side elevation, partly in section, of the construction shown in Figure 7 with the primary pump shaft shown offset downwardly.
Figure 9:
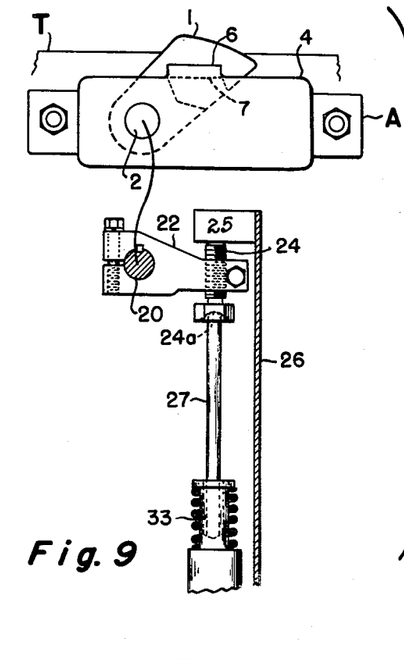
Figure 9 is a diagrammatic view of the ramp lever, the pump lever connected by the ribbon spring, and illustrating the manner of adjusting the ramp in relation to the fixed stroke of the pump rod.
Figure 10:
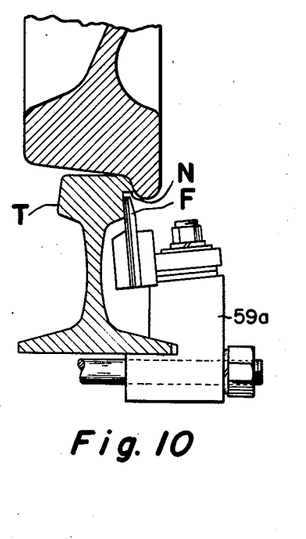
Figure 10 is a detail vertical sectional view showing the wiping bar nested in a notch in the rail.

At the lower end of each channel member 26, there is provided a bracket 31 which supports the pump proper. This pump includes a tubular casing 32 receiving the plunger 33 whose exposed end is provided with a flange 34 to serve as an abutment for one end of a coil spring 35 confined between said flange and the upper edge of the casing 32 (Figs. 5 and 6). Thus, the rods 27 are normally spring urged upwardly and this force is communicated to the ramp lever through the ribbon shaft 15 and its connections.

The pump casing is provided with grease inlet members 36 so that grease from the tank may readily make its way into the grease chamber of the pump casing in which the piston portion 37 of the plunger 33 operates. As will be readily seen from Figures 5 and 6, the piston 37 during its downward stroke picks up grease from the grease chamber and forces it into the orifice 38 of the pump thereby unseating the ball 39 against the force of its spring 40 and pushing grease outwardly into the pipe lines D and D'.

As previously indicated, the grease thus displaced by each stroke of the pump will feed into the piping system communicating with the grease distributing units or wiping bars F.

Adjustment of ramp

Having now generally described the ramp and its operating connections, it is pertinent to further explain the function of the adjusting screws 24 carried by arms 22 and whose socket portions 24ª engage the upper end of the push rods 27 of the pump.

The push rods 27 must have a fixed stroke in order to maintain proper efficiency in the pumping of the grease. Therefore, the ramp lever 1 must be so adjusted that its integral stop engages the fixed abutment 6 on the ramp frame 4.

The steps in accomplishing this adjustment are as follows: The pinch bolts 23 on pump arms 22 must be loosened. Referring first to the rear pump only: the pump plunger 33 is pushed down and the pump rod 27 is removed; back out adjusting screw 24 so that the end of the screw is flush with the pump lever arm. Referring now to the front pump, its adjusting screw 24 must be turned outwardly to raise the pump lever arm until stop 7 on the ramp lever is in full contact with stop 6 on the ramp frame. At this point the screw 24 should be turned approximately ¾ of an additional turn to tension the ribbon spring shaft. The pump lever arm of the front pump should be checked to make sure that the tip of its adjusting screw 24 is in engagement with the related stop 25 in the tank. If the screw is not in contact with 25, it should be turned inwardly until such contact is made. It is now in order to tighten the pinch bolt 23 in the front pump lever arm and insert pump rod 27 on rear pump and turn its adjusting screw 24 until contact is made with its related stop 25. The pinch bolt 23 on the rear pump lever arm may then be tightened. This procedure should be followed to adjust for wear as required.

The grease distributing units

Figure 11:
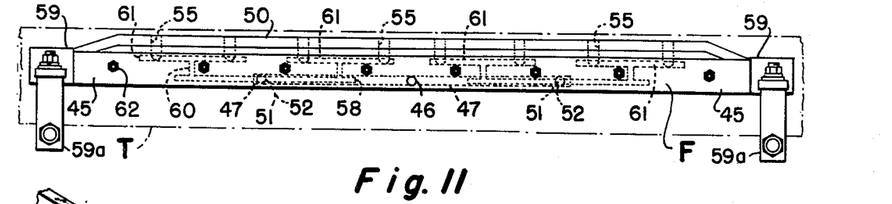
Figure 11 is a front view of the grease distributing unit or wiping bar.
Figure 12:
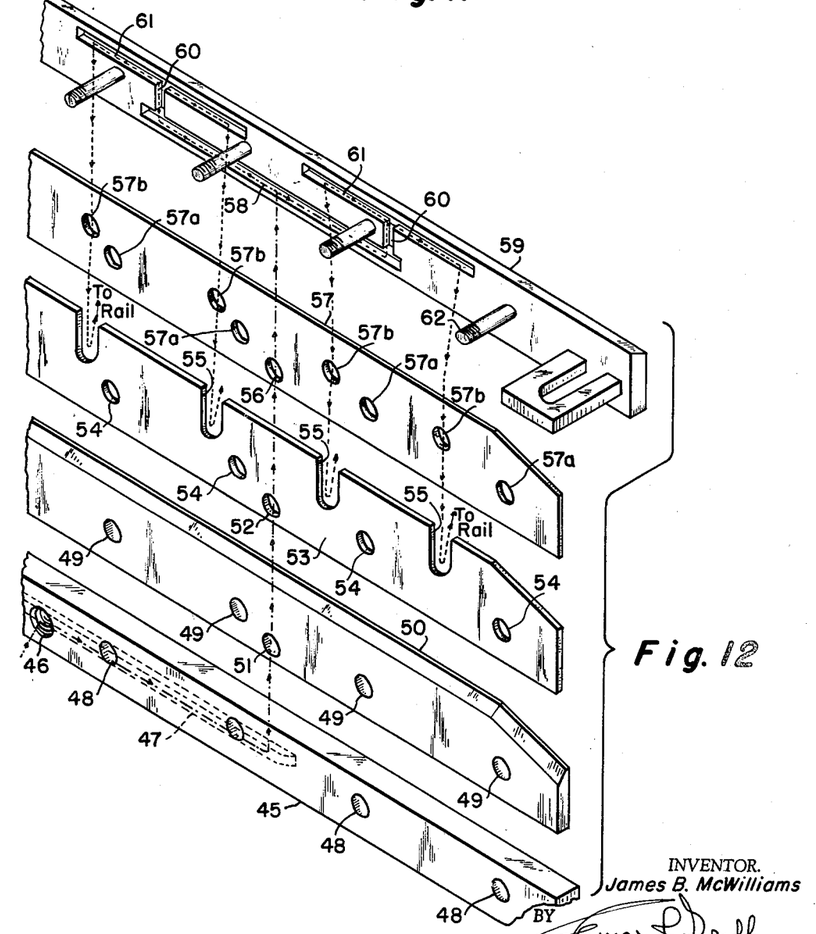
Figure 12 is a composite isometric view of the wiping or distributing bar assembly.
Figure 13:
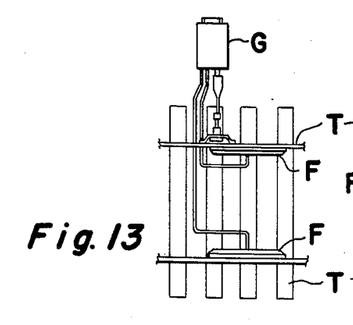
Figures 13 and 14 are diagrammatic views illustrating, respectively, track lubricating elements on opposite rails of the same track and also two units on the same rail of a track.
Figure 14:
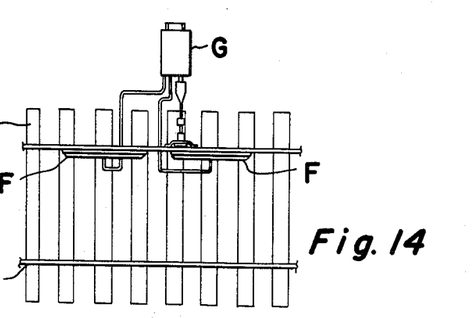

The grease distributing or wiping bar units F of Figure 1 are shown in detail in Figs. 11 and 12 and their outlet edges are placed on the gauge side of the rail and if desired can be located in a notch N at the underside of the rail head.

These units include an outer duct bar 45 provided with a grease inlet 46 which in turn communicates with the distribution channels 47 on the inner face of the bar. Bar 45 is also provided with bolt holes 48 which register with the bolt holes 49 on the wiping bar 50. When the wiping bar is in contact with the inner face of the duct bar, the outlets of the channels 47 discharge through openings 51 of the wiping bar which register with openings 52 in the passage plate 53. This passage plate is provided with fastening receiving openings 54, 54 which register with the openings 49 of the wiping bar 50. In addition, the passage plate 53 is provided with a series of upwardly opening notches 55 whose function will presently appear.

The grease openings 52 of the passage plate 53 register with the grease port 56 of the gasket plate 57. The ports 56 in turn communicate with the channel 58 of the wiping bar support 59. This bar has the vertical channels 60 which communicate with the longitudinal channels 58 and which vertical channels 60 in turn communicate with the upper longitudinal channels 61 so that grease supplied from channel 47 through ports 51, 52 and 56 will be supplied by the upper channels 61 to the vertical notches 55 and thus supply grease to the rail. The plate 57 also has grease ports 57b which pass grease from long channels 61 back to notches 55. The wiping bar support assembly 59 is provided with the threaded bolts 62 which are intended to pass through the registering openings 48, 49, 54 and 57a to hold the assembly in final form. Also, the back bar 59 has lugs to assist in supporting it on the rail by the customary rail clamps 59a.

The path of grease in the distributing unit (Fig. 11) from inlet 46, channels 47 to channels 58 is shown in dot-and-dash lines. The path from 58, 60, 61 to notches 55 is shown by dotted lines.

*General operation*

It will now be seen that when the apparatus described is installed in track as shown in Fig. 1, the passing of car wheels will depress the ramp lever 1, and actuate the pumps through the spring ribbon shaft 15, pump shaft 20, levers 22 and the pump rods 27. Each depression of a plunger 33 and a piston 37 by the ramp lever will displace grease into the grease distributing pipes D and D' thus push it out of the mouths of the notches 55 and on to the wiping bar and rail.

The arrangement of the wiping bar assembly permits of use of adequate grease supply to lubricate the gauge side of the rails as required under service conditions.

I claim:

1. In a lubricator for the rails of railway track, the combination, comprising a ramp assembly including a frame having a laterally offset tubular bearing portion, means for adjustably supporting said frame on a rail of the track, a ramp lever having an integral stub shaft and car wheel striking portion disposed at right angles and said stub shaft journalled in said tubular portion of the frame, cooperating stop means on the frame and lever for limiting the upward movement of said lever, a coupling adjustably secured to the stub shaft, a ribbon spring having slots in its opposite ends and medially twisted to have its opposite ends disposed at an angle of 90°, a fastening on said coupling passing through one of said slots of the spring for connecting the coupling thereto, a lubricant storage tank, pump means in the tank, a primary pump shaft connected with the pump means, a coupling adjustably secured to the pump shaft, a fastening on said coupling passing through the slot in the other end of the ribbon spring for connecting said primary pump shaft to said ribbon spring, and means in said pump means for adjusting said primary pump shaft to angularly adjust the same together with the ribbon spring to cause the stub shaft to maintain the ramp lever in proper elevated position.

2. In a lubricator for the rails of railway tracks, the combination, comprising, grease distributing units on the rails, a ramp lever pivotally supported on a rail to move under the impact of successive passing car wheels, a lubricant tank, constant stroke pump means in the tank, shafting for operating said pump means by the ramp lever, and tubing between said pump means and said grease distributing units, said units each including an outer duct bar having an inlet on its outer face for connection with said tubing and distribution channels on its inner face, a wiping bar adjacent the duct bar and having openings communicating with said distribution channels, a grease passage plate having openings registering with the openings of the wiping bar and also having grease outlet notches whose outlets terminate at the upper edge of the wiping bar, a gasket plate having openings communicating with related openings in the passage plate, and a wiping bar support having on its inner face upper and lower longitudinal channels connected by vertical channels, said lower channels communicating with the openings in the gasket plate and said upper channels communicating with the notches of the passage plate.

3. In a lubricator for the rails of railway track wherein the grease distributing units at the gauge side of the rails are in communication with a grease tank embedded in the track ballast through the medium of flexible tubes, car wheel actuated pump means removably mounted in the tank for ready installation and servicing said means including a primary pump shaft journalled in the upper portion of the tank, a transverse support fixed in the tank parallel to said primary shaft, a lever arm on said shaft, a vertical pump carrying support, fastenings detachably connecting the upper end of the vertical support with the transverse support, and a pump mounted on the lower end of said vertical support and having a pump rod detachably engaging the pump lever arm, the said vertical support being removable from and replaceable in the tank by manipulating said fastenings, whereby said pump and its rod disconnected from the lever arm may be moved laterally to disengage the pump rod from the pump lever arm preliminary to lifting the vertical support and the pump assembly vertically out of the tank.

References Cited in the file of this patent

UNITED STATES PATENTS

| | | |
|---|---|---|
| 1,157,148 | Bond | Oct. 19, 1915 |
| 1,556,506 | Fox | Oct. 6, 1925 |
| 2,104,176 | Warr | Jan. 4, 1938 |
| 2,349,259 | Fuller | May 23, 1944 |
| 2,611,449 | Etzelt | Sept. 23, 1952 |